United States Patent [19]

Asanuma et al.

[11] Patent Number: 5,175,208
[45] Date of Patent: Dec. 29, 1992

[54] METHOD FOR PREPARING BLOCK COPOLYMERS OF PROPYLENE

[75] Inventors: Tadashi Asanuma; Mitsuru Ito; Tutomu Iwatani; Kaoru Kawanishi; Nobutaka Uchikawa; Shigeru Kimura; Ryuichi Sugimoto, all of Osaka, Japan

[73] Assignee: Mitsui Toatsu Chemicals, Inc., Tokyo, Japan

[21] Appl. No.: 377,268

[22] Filed: Jul. 10, 1989

[30] Foreign Application Priority Data

Jul. 18, 1988 [JP] Japan ................................. 63-176964
Jan. 19, 1989 [JP] Japan ................................... 1-8500
Apr. 10, 1989 [JP] Japan .................................. 1-88046

[51] Int. Cl.$^5$ ............................................. C08F 297/08
[52] U.S. Cl. ............................................. 525/53; 525/323
[58] Field of Search ................................... 525/53, 323

[56] References Cited

U.S. PATENT DOCUMENTS

| | | |
|---|---|---|
| 3,345,431 | 10/1967 | Harban. |
| 3,475,517 | 10/1969 | Renaudo. |
| 3,514,501 | 5/1970 | Leibson et al. ............... 525/53 |
| 4,291,132 | 9/1981 | Clifford ........................ 525/53 |
| 4,492,787 | 1/1985 | Takashima et al. .............. 525/53 |
| 4,692,501 | 7/1987 | Mineshima et al. ............. 525/53 |
| 4,751,265 | 6/1988 | Asanuma et al. ............... 525/323 |

Primary Examiner—Carman J. Seccuro
Attorney, Agent, or Firm—Burns, Doane, Swecker & Mathis

[57] ABSTRACT

An improved method for preparing block copolymers of propylene which comprises providing a polymerizer composed of at least two reaction vessels connected to one another, substantially homopolymerizing propylene in a first step and then copolymerizing ethylene and propylene in a second step in the presence of a stereoregular catalyst, characterized by carrying out the homopolymerization of propylene in the polymerizer composed of at least two reaction vessels connected to one another in series, then introducing the resulting polymer slurry into a countercurrent washing column and countercurrently washing the slurry with propylene, introducing the washed slurry withdrawn from the lower part of the washing column into a reaction vessel in the second step connected to the washing column and performing the polymerization of ethylene and propylene, of which ratio ranges from 15/85 to 95/5. According to this method, a block copolymer of propylene exhibiting excellent physical properties can be obtained efficiently.

3 Claims, 1 Drawing Sheet

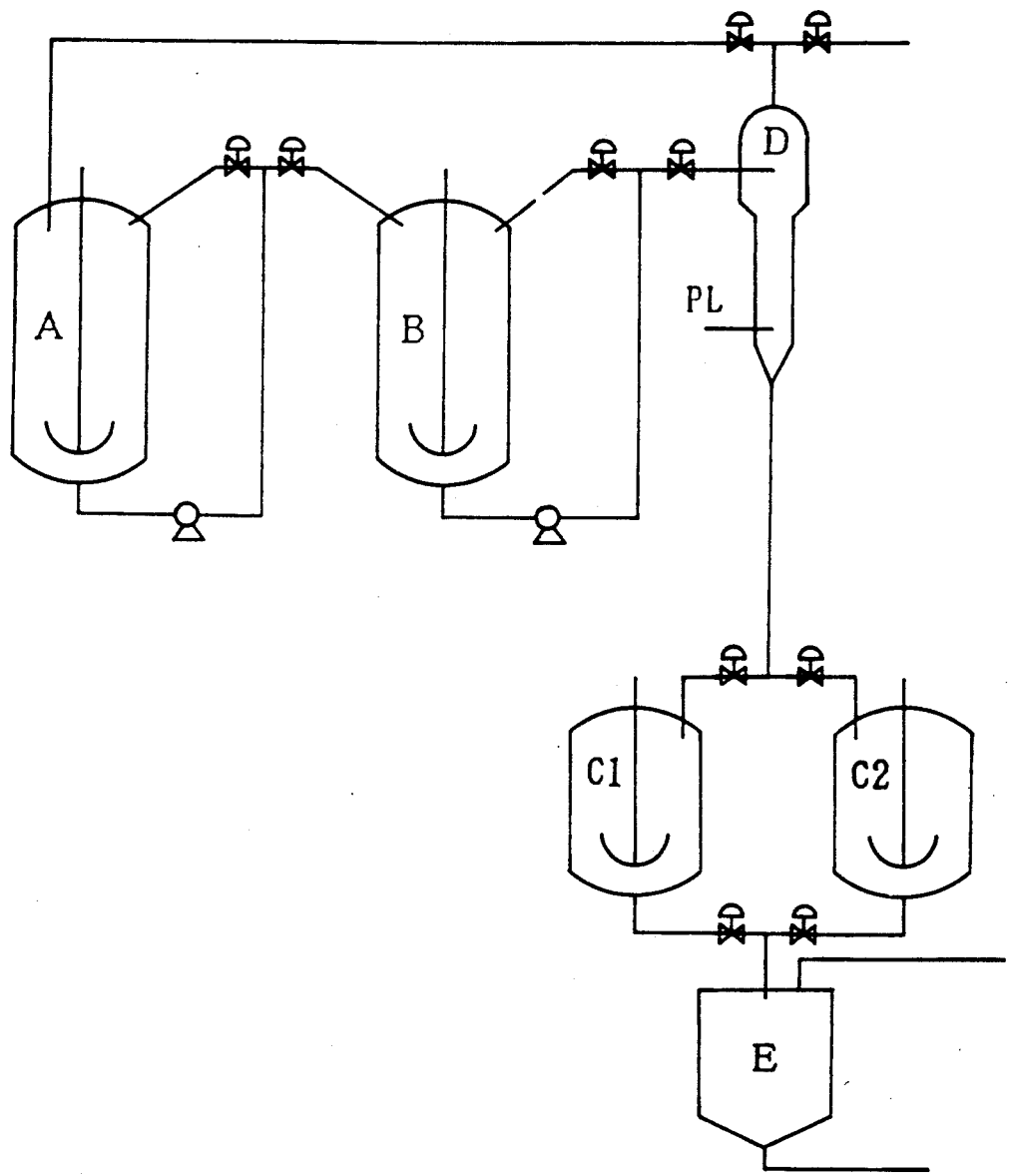

METHOD FOR PREPARING BLOCK COPOLYMERS OF PROPYLENE

BACKGROUND OF THE INVENTION

1. Field of the Invention

The present invention relates to a method for preparing block copolymers of propylene and more particularly, to an improved method for preparing block copolymers of propylene in which an apparatus for polymerization comprising a countercurrent type washing column disposed between a polymerizer for substantially homopolymerizing propylene and a polymerizer for copolymerizing ethylene and propylene.

2. Prior Art

There have widely been carried out methods for preparing isotactic polypropylenes which comprise first substantially homopolymerizing propylene and then copolymerizing ethylene and propylene for the purpose of improving its impact resistance, in particular, that at a low temperature. On the other hand, there have been many attempts to improve the balance between the impact resistance and rigidity of isotactic polypropylenes.

In general, the balance between the impact resistance and rigidity of isotactic polypropylenes depends on the weight ratio of portions formed through the substantial homopolymerization of propylene to those formed by the copolymerization of ethylene and propylene. The impact resistance thereof is further influenced by the molecular weight of the copolymerized portions and the ratio of monomers from which copolymerized portions are derived exerts influence on the rigidity of the resulting polymer. Therefore, it is necessary to change the ratio of monomers to be copolymerized and the molecular weight of the copolymerized portions by, for instance, carrying out multi-stage polymerization in response to physical properties required of the polymer. To solve this problem, the inventors of this invention had already proposed a method comprising a combination of a continuous polymerization as a first atep and a batch polymerization as a second step, in which the effectiveness of the bulk polymerization is utilized and which provides block copolymers having excellent balance between the impact resistance and the rigidity thereof (see, for instance, U.S. Pat. No. 4,751,265). However, this method suffers from some problems. For instance, it requires the use of an excess of organoaluminum compounds or the like; the unit of catalyst such as an organoaluminum compound is low; if a method for purifying the resultant polymer comprising simply evaporating unreacted monomers after the polymerization to remove the same is adopted, the amount of the catalyst remaining in the polymer becomes large; and if a reaction in which the reaction ratio of ethylene is large is carried out in a later stage of the batch polymerization process, conditions for recovery and reuse of ethylene are greatly restricted.

SUMMARY OF THE INVENTION

Accordingly, an object of the present invention is to solve the foregoing problems associated with the conventional methods and to thus provide a method for preparing block copolymers of propylene having excellent physical properties in a high yield.

The aforesaid object of the present invention can effectively be achieved by providing a method for preparing block copolymers of propylene which comprises providing a polymerizer composed of at least two reaction vessels connected to one another, substantially homopolymerizing propylene in a first step and copolymerizing ethylene and propylene of which the weight ratio ranges from 15/85 to 95/5, in a second step, in the presence of a stereoregular catalyst, characterized by carrying out the polymerization according to bulk polymerization technique in which propylene per se serves as a polymerization medium, performing the first step of substantial homopolymerization of propylene in a polymerizer composed of at least two reaction vessels connected to one another in series, then introducing the resulting polymer slurry into a countercurrent type washing column and countercurrently washing the slurry with propylene, introducing the wash liquid of propylene withdrawn from the upper part of the washing column into the reaction vessel in said first step, while introducing the washed slurry withdrawn from the lower part of the washing column into a polymerizer in said second step connected to the washing column and performing the copolymerization of ethylene and propylene of which weight ratio ranges from 15/85 to 95/5.

BRIEF EXPLANATION OF THE DRAWING

The accompanying drawing is a flow sheet of an appratus for polymerization used in Examples of this invention.

DETAILED DESCRIPTION OF THE INVENTION

The stereoregular catalysts as used herein are not limited to specific ones and various known catalysis systems can be used. In general, a catalyst system comprising a transition metal catalyst, an organoaluminum compound and optionally, a stereoregularity-enhancing agent can be employed. Preferred examples of such transition metal catalysts are titanium halides (for instance, titanium trichloride, obtained by reducing titanium tetrachloride with metallic aluminum, hydrogen or an organoaluminum compound), or those further modified with an electron donating compound. Examples of such catalyst systems include a system comprising such a transition metal catalyst, an organoaluminum compound and optionally, a stereo-regularity-enhancing agent such as an oxygen-containing organic compound and a system comprising a transition metal catalyst composed of a titanium halide supported on a carrier such as magnesium halide or those further treated with an electron donating compound, an organoaluminum compound and optionally, a stereoregularity-enhancing agent such as an oxygen-containing organic compound. Specific examples thereof are disclosed in, for instance, the following articles:

Ziegler-Natta Catalysts and Polymerization, John Boor Jr., issued by Academic Press; Journal of Macromolecular Science-Reviews in Macromolecular Chemistry and Physics, C24(3) 355–385 (1984) and ibid, C25(1), 578–597 (1985).

Preferred examples of the foregoing stereoregularity-enhancing agents include oxygen-containing compounds such as ethers, esters, orthoesters and alkoxysilicon compounds; and nitrogen atom-containing compounds such as amines and amides, which are commonly utilized. On the other hand, examples of the aforesaid electron donating compounds include alcohols, aldehydes and water which are commonly used in addition to the above-mentioned compounds.

Examples of the organoaluminum compounds herein used are trialkyl aluminum, dialkyl aluminum halides, alkyl aluminum sesquihalides and alkyl aluminum dihalides wherein the alkyl groups of these compounds are, for instance, methyl, ethyl, propyl, butyl and hexyl groups and halogen atoms thereof are, for instance, chlorine, bromine and iodine.

In the method of this invention, the substantial homopolymerization of propylene as the first step is carried out in a polymerizer composed of at least two reaction vessels connected to one another according to the bulk polymerization technique. The term "substantial homopolymerization of propylene" herein means that it is the homopolymerization of propylene in a strict meaning and that if propylene is copolymerized with other olefins such as ethylene, butene and/or hexene, the copolymerization should be performed so that the amount of the olefins other than propylene is not more than 6% by weight whereby the polymer finally obtained has sufficient rigidity. The polymerization is carried out at a temperature ranging from ambient temperature to 100° C. and the polymerization pressure is selected so that the polymerization medium maintains its liquid state at that temperature. This substantial homopolymerization of propylene is usually performed so as to obtain a polymer in an amount of 95 to 40% by weight on the basis of the weight of the whole polymer. This is because if it exceeds 95% by weight, the impact resistance of the resulting polymer is not satisfactorily improved, while if it is less than 40% by weight, the rigidity peculiar to polypropylene is lowered.

In the method of this invention, the resulting polymer slurry formed in the first step is then introduced into a countercurrent type washing column and countercurrently washed with propylene therein. The washed polymer slurry is introduced into a polymerizer in which the copolymerization of ethylene and propylene is performed. In this respect, there is no particular restriction in the method of countercurrent washing in this invention and thus various known methods and means can be employed (see, for instance, U.S. Pat. No. 3,262,922, U.S. Pat. No. 4,053,697, Jap. Pat. Kokai Nos. Sho 51-143091. Sho 51-139886 and Sho 58-210908). Regarding the washing temperature, it is preferred to control it so that the temperature of the washed slurry withdrawn from the lower part of the countercurrent washing column is equal to or less than the copolymerization temperature in the second step. The wash liquid withdrawn from the upper part of the countercurrent washing column may be introduced into a distillation column to recover propylene, but it is preferred to put the wash liquid as such back into the polymerization zone for the substantial homopolymerization of propylene in the first step, for ensuring the use of a sufficient amount of the catalyst for imparting stereoregularity to the polymer. This permits the effective use of organometallic compounds and/or electron donating compounds dissolved in propylene and the saving of energy required for recovering propylene. Moreover, it is also possible to design the washing column in such a manner that particles of the transition metal catalyst which are not sufficiently reacted can be entrained with the wash liquid to withdraw them from the upper portion of the countercurrent washing column and to thus return the particles to the polymerization zone in the first step, by increasing the linear velocity of the washing liquid.

In the method of this invention, the copolymerization of ethylene and propylene in the second step may be performed in a batch manner or may be continuously carried out utilizing at least one reaction vessel.

The copolymerization of ethylene and propylene in the second step is performed by optionally adding an organoaluminum compound and/or an electron donating compound after receiving the polymer slurry obtained in the first step. Examples of these organoaluminum compounds and the electron donating compounds are the same as those listed above in connection with the preparation of catalysts.

In the polymerization in a batch manner, the polymerizer used for batch polymerization is preferably composed of at least two reaction vessels connected to the washing column in parallel relation to simultaneously perform the batch polymerization and continuous reception of the polymer slurry counter-currently washed. Thus, the copolymerization in the second step can be carried out while receiving the polymer slurry from the washing column in another reaction vessel of the second step.

The copolymerization in the second step is performed in a weight ratio of ethylene to propylene ranging from 15/85 to 95/5. A part of ethylene may be replaced with other olefins such as butene, pentene and/or hexene. If the ratio is out of the above defined range, the impact resistance of the resulting polypropylene cannot sufficiently be improved. It is a matter, of course that the copolymerization is carried out in multistages by changing the ratio of the monomers and/or molecular weight thereof or further the kind of the electron donating compounds can be changed to thus change the ratio of the monomers in multistages.

The foregoing copolymerization reaction is carried out at a temperature ranging from 0° to 80° C., preferably 30° to 70° C. and the reaction pressure is determined depending on the amount of ethylene or the like introduced into the reactor to maintain the foregoing ratio.

According to another embodiment of the present invention, the copolymerization in the second step may be performed continuously. In such a case, the copolymerization is preferably carried out in at least two reaction vessels connected to one another from the viewpoint of physical properties of the resulting polymer. In each reaction vessel, the copolymerization can be carried out under the same conditions as those defined above in connection with the batch copolymerization. If the ratio of ethylene to propylene is increased in the later reaction vessel(s) among the two or more of reaction vessels connected to each other, it is preferred to add an electron donating compound in the later reaction vessel. This is because it is difficult to transfer the slurry to the reaction vessel having a higher pressure and even if it is intended to reduce the polymerization temperature to thereby drop the polymerization pressure in such a case, the reduction of heat of reaction is difficult and hence the productivity per volume of the reaction vessel is lowered.

The electron donating compounds used for changing the ethylene/propylene ratio are selected depending on the kinds of the transition metal catalysts. In general, those usable for copolymerization enriched with ethylene are, for instance, dicarboxylic acid diesters represented by the general formula,

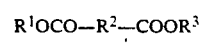

wherein $R^1$ and $R^3$ are the same or different and are a hydrocarbon radical having 1 to 12 carbon atoms and $R^2$ is a hydrocarbon radical having 1 to 12 carbon atoms, for example dialkyl esters of phthalic acid or 1,2-cyclohexanedicarboxylic acid;

carboxylic acid monoesters represented by the general formula, $$R^4COOR^5$$

wherein $R^4$ and $R^5$ each stand for a hydrocarbon radical of 1 to 12 carbon atoms;

phosphoric acid esters represented by the general formula, $$(R^6O)_3PO$$

wherein $R^6$ is hydrogen atom or a hydrocarbon radical having 1 to 12 carbon atoms, provided that all of the three $R^6$s are not hydrogen atom, for example, methyl, ethyl, propyl, butyl, pentyl, hexyl, heptenyl, octyl, phenyl or benzyl ester of phosphoric acid; and amines represented by the general formula, $$R_2^7NC_2H_5NR_2^7$$

wherein $R^7$ is a hydrocarbon radical having 1 to 12 carbon atoms, for example $R^7$ being methyl, ethyl, propyl, butyl, pentyl, hexyl, heptyl, octyl, phenyl or benzyl.

Moreover, those usable for copolymerization enriched with propylene are, for instance, silane compounds represented by the general formula, $$R_n^8Si(OR^9)_{4-n}$$

wherein $R^8$ and $R^9$ are the same or different and are a hydrocarbon radical having 1 to 12 carbon atoms and n is integer of 0 to 3, for example compounds wherein $R^8$ is a hydrocarbon radical such as methyl, ethyl, propyl, butyl, pentyl, hexyl, heptenyl, octyl, phenyl or toluyl group and $R^9$ is methyl, ethyl, propyl, butyl, pentyl, hexyl, heptenyl or octyl group.

In cases where electron donating compounds different from those used in the homopolymerization of propylene in the first step are used in the copolymerization in the second step, it is preferable to strictly carry out the washing in the counter-current washing column. In addition, if the ethylene/propylene ratio is changed in the copolymerization step, it is particularly preferred that the electron donating compound be not used in the initial stage of the copolymerization step but be used only in the subsequent stage(s). This is because if the electron donating compounds are used in combination, the reaction ratio of ethylene/propylene is not effectively changed.

There is no restriction on the molecular weight of the polymeric moiety obtained by substantial homopolymerization of propylene and that of the polymeric moiety obtained by copolymerization of ethylene and propylene. However, it is typical to control the molecular weight thereof so that the intrinsic viscosity measured at 135° C. in tetralin is in the order of from 0.5 to 3 dl/g for the homopolymerized portion and 0.5 to 20 dl/g for the copolymerized portion, and so that the melt flow index (hereunder referred to as "MI" for simplicity) as a copolymer determined at 230° C. under a load of 2.3 kg in the order of from 0.1 to 100 g/min.

The method of the present invention will hereunder be explained in more detail with reference to the following Examples. In the following Examples and Comparative Examples, various properties are determined according to the methods specified below:

Melt flow index: ASTM D1238 (at 230° C., under a load of 2.16 kg);
Modulus of stiffness: ASTM D747-63 (at 23° C.);
Izod impact strength, notched: kg-cm/cm; ASTM D256-56 (at 23° C. and −10° C.);
DuPont impact strength: kg-cm/($\frac{1}{2}$") diameter; JIS K6718 (at 23° C. and −10° C.).

Moreover, intrinsic viscosity is determined at 135° C. in tetralin and isotactic index (hereunder referred to as "II" for simplicity) is determined by extracting a sample with boiling n-heptane for 6 hours using a Soxhlet extractor and calculating the amount of the residue remaining after extraction.

EXAMPLE 1

(i) Preparation of Transition Metal Catalyst

An oscillating mill equipped with 4 pots for pulverization (internal volume: 4 liters) containing 9 kg of steel balls of 12 mm in diameter is provided. To each pot there were added 300 g of magnesium chloride, 45 ml of tetraethoxysilane and 60 ml of alpha,alpha,alpha-trichlorotoluene under a nitrogen gas atmosphere and the pulverization of magnesium chloride was performed for 40 hours.

300 g of the foregoing co-pulverized material was introduced into a 5-liter volume flask followed by adding 1.5 liter of titanium tetrachloride and 1.5 liter of toluene thereto, stirring the resulting mixture at 80° C. for 30 minutes, then allowing it to stand to remove the supernatant (this operation was repeated twice) and washing the solid contents 10 times with 4 liters of n-heptane.

The resulting transition metal catalyst contained 1.9% by weight of titanium.

(ii) Polymerization Reaction

Polymerization was performed utilizing a polymerization apparatus shown in the figure. In the figure, autoclaves A and B are reaction vessels for carrying out continuous polymerization, D represents a countercurrent washing column, autoclaves C1 and C2 are reaction vessels for carrying out copolymerization and E represents a cyclone. Continuous polymerization was performed in a polymerization apparatus comprising two 300-liter volume autoclaves A and B connected to one another. There was introduced, into the autoclave A through a nozzle, a mixture of the foregoing catalyst, diethyl aluminum chloride and methyl toluylate whose flow rates were 1 g/h, 4.8 ml/h and 2.8 ml/h, respectively and there were introduced, thereinto through another nozzle, triethylaluminum and propylene in flow rates of 1.5 ml/h and 30 kg/h, respectively. Slurry formed was continuously withdrawn from the autoclave A at a rate of 30 kg/h and was introduced into the autoclave B. At the same time, triethylaluminum was introduced into the autoclave B in a rate of 3.0 ml/h. The initial temperature in each autoclave was maintained at 75° C. and the concentration of hydrogen in the gas phase was 6.5 mole%. The slurry withdrawn from the autoclave B was introduced into a countercurrent washing column composed of an upper part having an inner diameter of 10 cm and a length of 10 m and a lower part having an inner diameter of 30 cm and a length of 2 m, through the upper portion thereof in a flow rate of 30 kg/h. At the same time, purified propylene maintained at 30° C. was introduced into the column from the lower portion thereof and there were withdrawn wash liquid of propylene from the upper portion of the column at a rate of 40 kg/h and the washed slurry of polypropylene from the lower portion at a rate of 30 kg/h. 30 kg of the wash liquid of propylene withdrawn from the upper portion of the column was put back into the autoclave A and the remaining wash liquid was taken out of the system. Thus, the introduction of fresh propylene into the autoclave A was stopped after initiating the introduction of propylene wash liquid thereinto and the amount of triethylaluminum to be introduced was reduced so that the activity thereof in the autoclave A became approximately identical to its initial level. On the other hand, the slurry withdrawn from the lower portion of the washing column was alternately introduced, through a nozzle into autoclaves C1 and C2 every 30 minutes, followed by introducing ethylene and hydrogen after receiving the slurry in the autoclaves, raising the temperature up to 45° C., then introducing 3.0 ml of triethylaluminum and carrying out polymerization at 50° C., for 15 minutes at an ethylene concentration of 35 mole% and hydrogen concentration in the gas phase of 0.6 mole%. Then the slurry was purged and received in a flash tank and then unreacted monomers were removed to thus recover a block copolymer of propylene at a rate of 12 kg/h. The resultant copolymer was granulated in an ordinary manner and formed into as injected sheet of 1 mm in thickness whose physical properties were then evaluated. The results obtained are summarized in the following Table 1.

EXAMPLE 2

(i) Preparation of Transition Metal Catalyst B

To a 20-liter volume autoclave, there were charged 7 liters of purified kerosene, 100 g of magnesium chloride and 370 g of 2-ethylhexanol and the mixture was stirred at 100° C. for 24 hours to ensure complete dissolution thereof. After adding 23 g of phthalic anhydride to the resulting solution and stirring the same, the solution was dropwise added gradually to 40 liters of titanium tetrachloride maintained at −10° C. contained in a 100-liter volume autoclave with stirring. Thereafter, the temperature of the solution was slowly raised and when it reached 100° C., the solution was treated with 56 ml of diisobutyl phthalate for one hour. Then the supernatant was removed followed by adding 20 liters of titanium tetrachloride, stirring the solution at 100° C. and washing, the solid contents with n-heptane 10 times to obtain the transition metal catalyst.

This transition metal catalyst B contained 2.8% by weight of titanium and 7.2% by weight of diisobutyl phthalate.

Propylene was pretreated with the transition metal catalyst B obtained in the foregoing reaction. To a 5-liter volume flask containing 3 liters of heptane, there were added 50 g of the foregoing transition metal catalyst B, 10 ml of diethylaluminum chloride and 150 g of propylene. After stirring the mixture at 20° C. for 2 hours, the mixture was allowed to stand to remove the supernatant and further the solid contents were washed with 3 liters of heptane to thus obtain a slurry of the transition metal catalyst.

(ii) Polymerization Reaction

The same procedures as in Example 1 were repeated except that, as the catalyst to be introduced into the autoclave A, 0.3 g/h of the transition metal catalyst B (as a transition metal catalyst component), 2 ml/h of triethylaluminum and 0.3 ml/h of diphenyldiethoxysilane were introduced thereinto. In the case of batch polymerization, 2 ml of triethylaluminum and 0.2 ml of diphenyldiethoxysilane were added and the polymerization time was set up at 18 minutes. Thus, a block copolymer was obtained in a rate of about 11 kg/h. Physical properties of the resulting copolymer were determined and the results obtained were listed in the following Table 1.

COMPARATIVE EXAMPLE 1

Continuous polymerization was carried out in the same manner as in Example 1 and then the resultant slurry was introduced into a polymerizer for batch polymerization without washing the slurry. In this respect, the ethylene concentration in the gas phase and the hydrogen concentration were controlled to those in Example 1. Since in this case, the polymerization would proceed even during reception of the slurry, the amount of triethylaluminum to be introduced was changed to 1 ml/h and the polymerization time was also changed to 7 minutes so that the ethylene content of the resulting copolymer became identical with that in Example 1. Physical properties of the resultant copolymer are listed in the following Table 1.

COMPARATIVE EXAMPLE 2

Continuous polymerization was performed in the same manner as in Example 1 and, as in Comparative Example 1, a batch polymerization was carried out without washing the slurry. In the batch polymerization, approximately the same ethylene content was achieved by changing the polymerization time to 16 minutes without adding triethylaluminum. Physical properties of the resultant copolymer are listed in Table 1 given below.

EXAMPLE 3

A block copolymer was prepared according to the same procedures as in Example 2 except that, during the continuous polymerization, the hydrogen concentration in the gas phase was 10.5 mole%; the slurry was received in the autoclaves C1 and C2 alternately after withdrawing it from the counter-current washing column; to the autoclave which received the slurry there were introduced ethylene and hydrogen as well as 3.0 ml of triethylaluminum and 1.2 ml of ethyl 1,2-cyclohexyldicarboxylate; and the polymerization was performed at 50° C. for 15 minutes at a hydrogen concentration in the gas phase of 4 mole% and an ethylene concentration of 20 mole%. Physical properties of the resultant copolymer are summarised in Table 1 below. These results clearly indicate that copolymers having physical properties identical with those of the copolymer obtained in Example 1 can be prepared even when they are prepared under the condition of low ethylene concentration compared with that in Example 1.

EXAMPLE 4

The same procedures as in Example 3 were repeated to obtain a block copolymer at a rate of 13 kg/h except that, in the batch polymerization, 1.2 ml of di(2-ethylhexyl) phosphate was substituted for ethyl 1,2-cyclohexyldicarboxylate, the ethylene concentration in the gas phase was 25 mole% and the polymerization time was changed to 18 minutes so that the content of ethylene was identical with that in Example 3. In this respect, the molar ratio of di-(2-ethylhexyl) phosphate to titanium was 20 and the total pressure in the autoclave was 32 kg/cm$^2$. The results obtained are listed in Table 1.

EXAMPLE 5

The same procedures as in Example 3 were repeated to obtain a block copolymer at a rate of 14 kg/h except that, in the batch polymerization, 0.9 ml of triethyl phosphate was substituted for ethyl 1,2-cyclohexyl-dicarboxylate, the ethylene concentration in the gas phase was 25 mole% and the polymerization time was changed to 18 minutes so that the content of ethylene was identical with that in Example 3. In this respect, the molar ratio of triethyl phosphate to titanium was 30 and the total pressure in the autoclave was 32 kg/cm$^2$. The results obtained are listed in Table 1.

EXAMPLE 6

Continuous polymerization was performed using a polymerization apparatus used in Example 2 in which the autoclaves C1 and C2 for copolymerization were connected to the counter-current washing column in series. To the autoclave C1 for copolymerization there were added 0.2 ml/h of triethylaluminum and 10 kg/h of propylene in addition to the slurry withdrawn from the lower portion of the countercurrent washing column and the copolymerization was performed at the amount of residence slurry of 10 kg, a hydrogen concentration in the gas phase of 0.6 mole% and at ethylene concentration of 30 mole% at 50° C. The slurry was then withdrawn and introduced into the polymerizer C2 at a rate of 40 kg/h. Then triethylaluminum and cyclohexyldicarboxylic acid were added thereto at flow rates of 1.2 ml/h and 0.3 ml/h and the polymerization was carried out at 50° C., the amount of residence slurry of 10 kg, a hydrogen concentration in the gas phase of 0.6 mole% and an ethylene concentration of 25 mole% . The slurry could be transferred from the autoclave C1 to C2 since the ethylene concentration in the autoclave C2 was lower than that in the autoclave C1 and thus the pressure difference therebetween was 2 kg/cm$^2$. The ratio, ethylene/propylene, was examined on the copolymers obtained in the autoclaves C1 and C2 and it was found to be the same value (55/45) in both cases. Physical properties of the resultant polymer are summarized in the following Table 1.

TABLE 1

| Ex. No. | Ethylene Content, weight ratio | MI | Stiffness Modulus | Izod Impact 23° C. | Strength −10° C. |
|---|---|---|---|---|---|
| 1 | 8.5 | 6.8 | 11700 | 8.4 | 4.2 |
| 2 | 9.5 | 7.2 | 11600 | 9.2 | 5.0 |
| 1* | 9.0 | 7.2 | 8500 | 6.8 | 3.0 |
| 2* | 9.7 | 7.3 | 8400 | 7.0 | 3.2 |
| 3 | 9.2 | 15.7 | 11200 | 8.3 | 4.0 |
| 4 | 9.0 | 16.5 | 10700 | 8.5 | 4.1 |
| 5 | 9.5 | 17.0 | 10500 | 8.8 | 4.2 |
| 6 | 9.8 | 16.8 | 10900 | 8.4 | 4.0 |

*Comparative Example.

What is claimed is:

1. A method for preparing block copolymers of propylene which comprises a first step of substantially homopolymerizing propylene in the presence of a catalyst in a polymerizer composed of at least two reaction vessels connected to one another in series so as to form a polymer slurry wherein said homopolymerization is conducted by bulk polymerization with propylene as a polymerization medium, introducing the polymer slurry into a countercurrent type washing column and countercurrently washing the slurry with pure propylene so as to remove catalyst from the polymer slurry, introducing the wash liquid of propylene withdrawn from the upper part of the washing column into the reaction vessel of the first step, introducing the washed polymer slurry withdrawn from the lower part of the washing column into a polymerizer and in a second step, performing copolymerization of ethylene and propylene of which the weight ratio ranges from 15/85 to 95/5 in the presence of a stereoregular catalyst and wherein at least one of an electron donating compound and an organoaluminum compound is added to the polymerizer of the second step.

2. The method for preparing block copolymers of propylene according to claim 1 wherein the polymerization in the second step is alternately, batchwise carried out in at least two reaction vessels connected to the countercurrent washing column in parallel.

3. The method for preparing block copolymers of propylene according to claim 1 wherein the polymerization in the second step is continuously carried out in at least two reaction vessels connected to the countercurrent washing column in series.

* * * * *